United States Patent [19]

Gossink

[11] Patent Number: 4,844,594

[45] Date of Patent: Jul. 4, 1989

[54] REPLICA LENS HAVING A GLASS LENS BODY

[75] Inventor: Robert G. Gossink, Eindhoven, Netherlands

[73] Assignee: U.S. Phillips Corporation, New York, N.Y.

[21] Appl. No.: 144,826

[22] Filed: Jan. 14, 1988

[30] Foreign Application Priority Data

Jan. 26, 1987 [NL] Netherlands .................. 8700174

[51] Int. Cl.$^4$ .................. G02B 1/10; C03C 17/00
[52] U.S. Cl. .................. 350/417; 350/409; 351/166; 351/177
[58] Field of Search .................. 350/409, 417; 351/166, 351/177

[56] References Cited

U.S. PATENT DOCUMENTS

| | | | |
|---|---|---|---|
| 3,533,897 | 10/1970 | Robbins, Jr. et al. | 350/417 |
| 3,873,191 | 3/1975 | Veret et al. | 350/417 |
| 3,876,734 | 4/1975 | Howden | 350/417 |
| 3,917,766 | 11/1975 | Howden | 350/417 |
| 4,227,950 | 10/1980 | Spycher | 350/417 |
| 4,657,354 | 4/1987 | Kobayashi | 350/417 |

Primary Examiner—Bruce Y. Arnold
Assistant Examiner—Terry S. Callaghan

[57] ABSTRACT

A replica lens having a glass lens body 1 and a cured layer 2 of a synthetic resin composition provided thereon in which the refractive indices $n_1$, $n_2$ of the glass lens body and the synthetic resin composition, respectively, as well as the shrinkage factor $k$ of the synthetic resin composition upon curing thereof satisfy the relationship $n_1 = n_2(1-k) + k$.

3 Claims, 1 Drawing Sheet

REPLICA LENS HAVING A GLASS LENS BODY

BACKGROUND OF THE INVENTION

The invention relates to a replica lens having a glass lens body with a refractive surface having a replica skin of a cured synthetic resin. The replica skin is a correction skin having a free surface of the desired, usually very accurate, optical shape. The terms replica lens and replica skin refer to the manufacturing method, namely the replica process or copying process.

In this process a matrix is used which is manufactured, for example, from metal or glass and which has a surface which, apart from a possible shrinkage correction, is the exact negative of the desired refractive surface of the optical component to be manufactured by means of the said process, for example, in particular a lens. A glass lens body which is sometimes termed preform or substrate is provided on the refractive surface, for example, a spherical surface, with a small quantity of a liquid, curable synthetic resin composition, For example, a drop of a light-curable or heat-curable synthetic resin composition (lacquer) is provided on the refractive surface. The lens body comprising the drop of lacquer is pressed against the matrix surface, the lacquer spreading between the matrix and the lens body, so that in the final situation the entire refractive surface of the lens body is covered with the liquid lacquer composition. As an alternative the drop of lacquer may also be provided on the matrix surface. After spreading the liquid synthetic resin composition is cured, for example, by using heat or by exposure to light, via, for example, the transparent lens body. Finally the matrix is removed. The resulting replica lens comprises the glass lens body which at its refractive surface comprises a correction skin (replica skin) of a cured synthetic resin composition the free surface of which has a desired optical shape and is the negative of that of the matrix.

The above-described replica process can be carried out in a simple manner. An important advantage of this process is that a glass lens body can be used which has a comparatively simple shape and/or which has been manufactured in a simple manner. An example hereof is a glass lens body which has been manufactured by a simple pressing process and whose refractive surface, for example, a spherical or non-spherical surface, has not been subjected to any further grinding and/or polishing processes. The lens body manufactured by a pressing process will as a rule not have an optically perfect refractive surface. In this surface deviations from shape and unevennesses, for example pits, may be present. The replica skin gives the refractive surface of the lens body the ultimate optically accurate shape.

Applicants have established that a lens manufactured according to the replica process still has non-acceptable inaccuracies in the refractive surface. The deviations in shape and unevennesses in the refractive surface of the lens body will not be fully corrected or smoothed by the liquid resin composition used, because the synthetic resin composition shrinks upon curing.

As a result of this, undesired and unintentional unevennesses will occur in the free surface of the layer of the cured synthetic resin composition. The deviations in shape and unevennesses in the refractive surface of the lens body itself are as it were transmitted in a weakened form to the free (optical) surface of the cured lacquer layer. This latter surface is the important, refractive surface of the replica lens.

In order to avoid these problems mentioned by the Applicants the primary cause might be removed and it would hence have to be ensured that no irregularities, for example unevennesses, occur in the refractive surface, for example, the spherical surface, of the glass lens body. However, this means a very careful grinding and polishing process so that series production is not readily possible or will otherwise lead to very expensive products.

SUMMARY OF THE INVENTION

According to an object of the invention a replica lens is provided in which the deviations in shape, for example, unevennesses in the refractive surface of the glass lens body, are optically corrected.

A replica lens of an excellent optical quality is manufactured by means of a process which is suitable for series production in which in particular a precision grinding process or polishing process is not necessary during the manufacture of the glass lens body.

These objects are achieved by means of a replica lens which comprises a glass supporting body with refractive index $n_1$ and a replica skin with refractive index $n_2$ provided on the refractive surface of the lens body and which is manufactured from a cured synthetic resin which during curing shows a shrinkage with shrinkage factor k and which is characterized in that the refractive indices of the lens body and the replica skin satisfy the relationship $$n_1 = n_2(1-k) + k$$

For practical applications the refractive index of the glass supporting body is adapted according to the abovestated relationship to the refractive index and shrinkage factor of the replica skin. The reverse is also possible, of course.

This means in practice that first a suitable material for the replica skin is chosen, for example, on the basis of the desired optical quality, brightness and/or hardness of the replica skin. For example, a light-cured, for example UV-light-cured, acrylate synthetic resin is preferably used as the material for the replica skin. A type of glass is then used for the lens body the refractive index of which according to the above-described relationship matches the refractive index and the shrinkage factor of the selected synthetic resin of the replica skin.

The replica lens according to the invention is particularly suitable for use in an optical system for projection television. In this application it relates to lenses having a comparatively large diameter of, for example, 10 cm. The lenses must have a high optical quality with very small tolerances as regards differences in the optical path length. These requirements are satisfied by the replica lens according to the invention. The replica lens according to the invention may also be used for other applications, for example for reading systems of optical discs and zoom lenses for video cameras.

In a further favourable embodiment of the replica lens according to the invention a compressed glass lens body is used. A compressed lens body is a comparatively cheap product which is suitable in particular for use in series production. The deviations in shape in the refractive surface of such a compressed product are corrected and compensated for by the measure according to the invention so that an optically high-grade replica lens results as will be explained in greater detail hereinafter.

DETAILED DESCRIPTION OF THE INVENTION

Figure 1A:
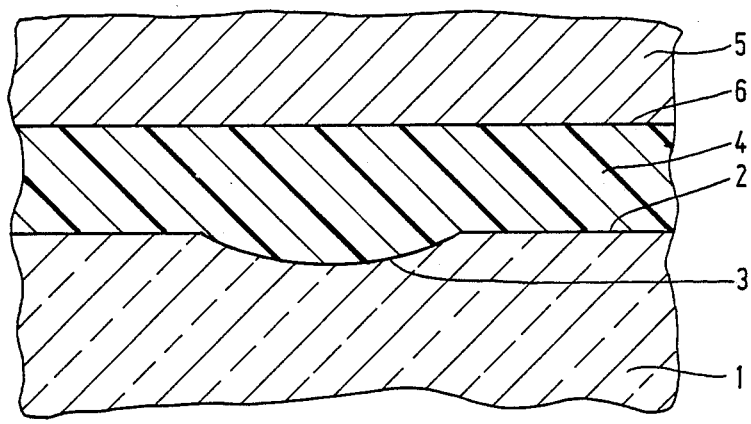
FIG. 1A is a cross-sectional view of an enlarged part of the replica lens at the area of an inaccuracy in the refractive surface of the glass lens body 1, in the situation in which the synthetic resin 4 of the replica lens has not been cured

Reference numeral 1 in FIG. 1A denotes a compressed glass lens body the refractive surface 2 of which has, by way of example, a spherical shape. Due to the considerable enlargement used in the drawing the surface 2 is denoted by a straight line. This surface comprises an inaccuracy in the form of a pit 3 the depth of which has a value of, for example, 100 μm. A layer 4 of a liquid UV-light-curable synthetic resin (lacquer) on the basis of an acrylate, in particular 1,1'-isopropylene-bis(p-phenoxyethylmethacrylate), is provided on the surface 2. According to this example the layer thickness is 500 μm. The liquid, curable composition upon curing has a shrinkage of 6%. The refractive index of the cured composition is 1.58. Lens body 1 with lacquer layer 4 is pressed against a matrix 5 manufactured from glass or metal the surface 6 of which has been very accurately ground and/or polished. This surface is the negative of the desired optical surface of the lens to be manufactured. The surface 6 has, for example, an aspherical shape. Due to the strong enlargement the surface 6 is shown in the Figure by a straight line.

Layer 4 of a curable composition (lacquer) is then cured by exposure to UV light which is focused on the layer 4 via the lens body 1. The UV light may also be focused on the layer 4 via matrix 5, provided this is transparent to the UV light. After the exposure the matrix 5 is removed and the replica lens as shown in FIG. 1B is manufactured.

Figure 1B:
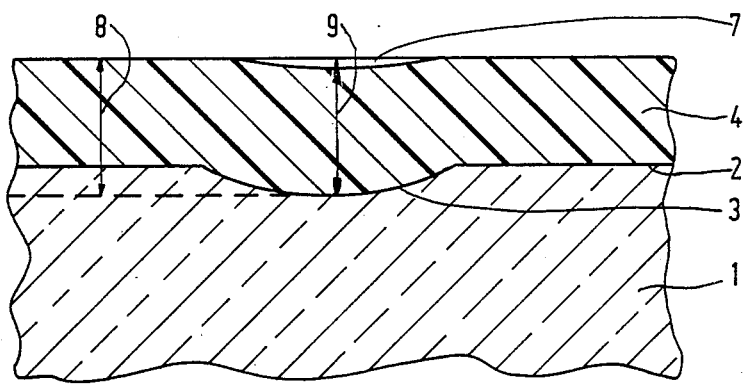
FIG. 1B is a similar view depicting the situation in which the synthetic resin has been cured.

In FIG. 1B the same reference numerals are used as in FIG. 1A. As a result of the shrinkage resulting from the curing the free surface of lacquer layer 4, which surface is an exact copy of surface 6 of matrix 5, a cavity 7 having a depth of $k\Delta d$, is formed wherein k is the shrinkage factor and $\Delta d$ is the depth of the pit 3.

According to the invention the refractive index $n_1$ of the glass lens body must satisfy the relationship $$n_1 = n_2(1-k) + k$$

wherein $n_2$ is the refractive index of the cured lacquer layer ($=1.58$) and k is the shrinkage factor of the lacquer ($=0.06$).

The refractive index of the glass lens body must hence be equal to $$n_1 = 1.58(1-0.06) + 0.06$$

$$n_1 = 1.545.$$

If for the lens body a glass type is used having a refractive index of 1.545, the difference in optical path length between light beams outside the cavity 7 and at the area of the cavity 7 is equal to 0 so that the cavity 7 has no influence on the optical quality of the replica lens.

The optical path length outside the cavity 7 is indicated in FIG. 1B by means of a line section 8. At the area of the cavity 7 the path length is denoted by line section 9.

Optical path length 8 is $$n_2(1-k)d + n_1\Delta d$$

| wherein $n_1$ | = refractive index glass | ($= 1.545$) |
|---|---|---|
| $n_2$ | = refractive index cured lacquer layer | ($= 1.58$) |
| k | = shrinkage factor | ($= 0.06$) |
| d | = thickness lacquer layer before curing | ($= 500$ μm) |
| $\Delta d$ | = depth of pit 3 | ($= 100$ μm) |

The value of the optical path length 8 outside the cavity hence is:
$1.58(1-0.06).500.10^{-6} + 1.545.100.10^{-6} = 897.10^{-6}$.

The optical path length 9 at the area of the cavity is $$k \cdot \Delta d + n_2(1-k)(d+\Delta d)$$

wherein $n_1$, $n_2$, k, d, and $\Delta D$ have the above meaning and value. The value of the optical path length 9 at the area of the cavity hence is:

$$0.06.100.10^{-6} + 1.58(1-0.6)$$
$$(500.10^{-6} + 100.19^{-6}) = 897.10^{-6}$$

The difference in optical path length is indeed equal to 0, Q.E.D.

What is claimed is:

1. A replica lens having a glass lens body with refractive index $n_1$ and a replica layer with refractive index $n_2$ provided on the refractive surface of the lens body and which is manufactured from a cured synthetic resin which during curing shows a shrinkage with shrinkage factor k, characterized in that the refractive indices of the lens body and the replica layer satisfy the relationship $$n_1 = n_2(1-k) + k.$$

2. A replica lens as claimed in claim 1, characterized in that the replica layer is manufactured from an acrylate synthetic resin which is cured by means of light, for example UV light.

3. A replica lens as claimed in claim 1, characterized in that the glass lens body is a compressed glass lens body.

* * * * *